United States Patent
Pers et al.

(10) Patent No.: US 11,495,945 B2
(45) Date of Patent: Nov. 8, 2022

(54) PRESSURE RELIEF SYSTEM AND A CONTAINER, BUILDING, ENCLOSURE OR CUBICLE INCLUDING A PRESSURE RELIEF SYSTEM

(71) Applicant: ABB Schweiz AG, Baden (CH)

(72) Inventors: Christer Pers, Västerås (SE); Raeto Stadler, Langnau Am albis (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/270,919

(22) PCT Filed: Sep. 5, 2019

(86) PCT No.: PCT/EP2019/073735
§ 371 (c)(1),
(2) Date: Feb. 24, 2021

(87) PCT Pub. No.: WO2020/049114
PCT Pub. Date: Mar. 12, 2020

(65) Prior Publication Data
US 2021/0194223 A1  Jun. 24, 2021

(30) Foreign Application Priority Data
Sep. 6, 2018  (EP) ..................... 18192873

(51) Int. Cl.
*H02B 13/02* (2006.01)
*H02H 7/125* (2006.01)
*H02B 13/025* (2006.01)

(52) U.S. Cl.
CPC ........... *H02B 13/025* (2013.01); *H02H 7/125* (2013.01)

(58) Field of Classification Search
CPC ..................... H02B 13/025; H02H 1/0015
See application file for complete search history.

(56) References Cited

U.S. PATENT DOCUMENTS 5,201,830 A * 4/1993 Braswell ............... B64D 13/02
244/129.5
6,407,331 B1  6/2002 Smith et al.
(Continued)

FOREIGN PATENT DOCUMENTS

| CN | 107979018 A | 5/2018 |
| DE | 3014497 A1 | 10/1981 |

(Continued)

OTHER PUBLICATIONS

Canadian Office Action; Application No. 3,111,885; Completed: Mar. 30, 2021; dated Apr. 1, 2021; 3 Pages.
(Continued)

*Primary Examiner* — Scott Bauer
(74) *Attorney, Agent, or Firm* — Whitmyer IP Group LLC

(57) ABSTRACT

An actively driven pressure relief system for a container, a building, an enclosure, or a cubicle with an electrical installation, the actively driven pressure relief system includes a panel. The system further includes a fault detection device for detecting an arc fault in the electrical installation of the container, the building, the enclosure or the cubicle; and a triggering unit for triggering an opening signal for the panel upon detection of an arc fault by the fault detection device. A panel opening mechanism opens the panel in a destructive manner. Further, a container, building, enclosure or cubicle with an actively operated pressure relief system is described. A method for relieving pressure from a container with a panel and an electrical installation inside the container is also described.

14 Claims, 2 Drawing Sheets

(56) References Cited

U.S. PATENT DOCUMENTS

| | | | |
|---|---|---|---|
| 8,575,916 B2 | 11/2013 | Roscoe | |
| 2011/0215645 A1* | 9/2011 | Schomburg | H02J 9/061 |
| | | | 307/65 |
| 2011/0286165 A1 | 11/2011 | Carlson et al. | |

FOREIGN PATENT DOCUMENTS

| | | | |
|---|---|---|---|
| DE | 3014557 A1 | 10/1981 | |
| EP | 3621166 A1 | 3/2020 | |
| JP | 2001197618 A | 7/2001 | |
| WO | 2020049114 A9 | 3/2020 | |

OTHER PUBLICATIONS

European Search Report; Application No. 18192873.0; dated Feb. 19, 2019; 6 Pages.
International Search Report and Written Opinion of the International Searching Authority; Application No. PCT/EP2019/073735; Completed: Nov. 14, 2019; dated Nov. 14, 2019; 14 Pages.
Chilean Search Report and Written Opinion; Application No. 202100546; Completed: Feb. 12, 2022; dated Feb. 18, 2022; 10 Pages.
Japanese Office Action; Application No. 2021-512617; dated May 4, 2020; 24 Pages.

* cited by examiner

PRESSURE RELIEF SYSTEM AND A CONTAINER, BUILDING, ENCLOSURE OR CUBICLE INCLUDING A PRESSURE RELIEF SYSTEM

TECHNICAL FIELD

The invention relates to the field of pressure relief panels, such as pressure relief panels in containers, buildings, enclosures, and cubicles having electrical installations inside. In particular, the invention relates to pressure relief panels reacting on overpressure in the containers, buildings, enclosures, or cubicles, the overpressure being induced by an electrical fault. The invention further relates to a method for relieving pressure from a container, building, enclosure, or cubicle having electrical installations, especially for relieving pressure from a container, building, enclosure, or cubicle by a panel in the case of an electrical fault.

BACKGROUND

Containers, buildings, enclosures and cubicles (which could collectively also be referred to as housings) having an electrical installation inside are especially protected against damage, in particular damage originating from electrical faults such as arc faults. Arc faults in electrical installations often lead to severe damages on the installation and the building, container, enclosure or cubicle. The electrical arc causes excessive heat that increases the volume of the surrounding gas leading to pressure build up. After a certain propagation time, the pressure wave hits the walls of the container or building. In order to withstand the over pressure generated by the arc fault, the installation, building, container, or cubicle is often equipped with over pressure release flaps or panels. A pressure relief flap or panel includes a pre-weakened metal sheet in customized sizes up to several square meters. At a specific defined over pressure, the pre-weakened metal sheet breaks and vents the over pressure.

The conventional pressure release panel is a passive device that starts to open once the pre-defined opening pressure is exceeded. The key factors for pressure relief are opening pressure and opening time. To get the best effect of the device, those two parameters should be kept to a minimum. But the passive panel of the conventional technique requires over pressure to start operate, hence it starts when the over pressure is already a fact and hits the wall. Thus, there is a significant time delay until the flap is open. This time delay is an issue since the pressure keeps rising until the flap is open and can vent the pressure. Therefore, the known technique includes a significant time delay for the flap to open and the pressure might still reach a critically level within the container, building, enclosure, or cubicle.

In view of the above, an actively driven pressure relief system; a container, building, enclosure, or cubicle including an actively driven pressure relief system; and a method for relieving pressure from a container, building, enclosure, or cubicle are provided that overcome at least some of the problems in the art.

SUMMARY

In view of the above, an actively driven pressure relief system, as well as a container, building, enclosure, or cubicle including an actively driven pressure relief system, and a method for relieving pressure from a container, building, enclosure, or cubicle with a panel and an electrical installation inside the container according to the pending claims are provided. Further aspects, advantages, and features of the present invention are apparent from the dependent claims, the description, and the accompanying drawings.

According to an aspect of the invention, an actively driven pressure relief system for a container, a building, an enclosure, or a cubicle with an electrical installation is described. The actively driven pressure relief system includes a panel and further includes a fault detection device for detecting an arc fault in the electrical installation of the container, the building, the enclosure or the cubicle; and a triggering unit for triggering an opening signal for the panel upon detection of an arc fault by the fault detection device.

According to a further aspect, a container, building, enclosure, or cubicle with electrical installation including one or more electrical devices is provided. The container, building, enclosure, or cubicle includes a panel being part of at least one wall or ceiling of the container, the building, the enclosure, or the cubicle; and an active pressure relief system according to embodiments described herein.

The actively driven pressure relief system according to embodiments described herein includes an actively operated panel, which may be operated by a fault detection device e.g. an arc fault detection device. Consequently, the pressure relief panel opens faster than known systems. Especially, the panel according to embodiments described herein may already be open when the pressure in the container, building, enclosure or cubicle builds up. In known systems, the panel opens when the raising pressure hits the panel. Therefore, when using the pressure relief system according to embodiments described herein, the pressure peak is reduced and the reaction of the panel is faster. The pressure rise may be a result of an arc fault in the container, building, enclosure or cubicle with the electrical installation. By trigging the pressure relief system according to embodiments described herein by means of, for instance, a triggering unit being in connection with an arc fault detection device, the pressure relief flap opens at the same time or before the pressure rise builds up.

Moreover, the available wall area for installation of panels or flaps is often limited. Due to the faster reaction and opening of the panel, the active panel or flap as described herein is more effective than the known passive system. Using the active panel or flap means that a lower total flap area is needed.

The actively driven pressure relief system according to embodiments described herein helps reducing or even avoiding the damages of the container, when the overpressure rises in the container before the panel is opened, e.g. with passively driven panels as used in known systems. When damages are reduced or avoided, material can be saved. Further, the reparation time after an arc fault can also be reduced with the pressure relief system according to embodiments described herein. Therefore, the actively driven pressure relief system according to embodiments described herein saves time and costs and makes the container, building, enclosure, or cubicles with electrical installations more secure.

According to a further aspect of the invention, a method for relieving pressure from a container, building, enclosure, or cubicle with a panel and an electrical installation inside the container, building, enclosure, or cubicle is described. The method includes detecting an arc fault in the electrical installation by a fault detection device; triggering an opening signal for the panel of the container, building, enclosure, or cubicle upon detection of an arc fault by the fault detection device; and forwarding the opening signal to the panel of the container, building, enclosure, or cubicle and initiating the opening of the panel of the container, building, enclosure, or cubicle.

According to yet a further aspect of the invention, a method for equipping a container, building, enclosure, or cubicle with electrical installation with an actively driven pressure relief system is described. The method includes providing one or more panels in one or more walls or ceilings of one or more container, building, enclosure, or cubicle; equipping the electrical installation with a fault detection device; and connecting the fault detection device with a triggering unit for triggering a panel opening signal upon detection of an arc fault by the fault detection device.

Embodiments described herein allow for a faster and more secure operation of a pressure relief system for a container, building, enclosure, or cubicle with an electrical installation inside. The costs for maintenance and repair are reduced, in the case of a fault in the electrical installation in the container, building, enclosure, or cubicle.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

DETAIL DESCRIPTION

According to embodiments described herein, an actively driven pressure relief system is provided, which in particular can be used in containers, buildings, enclosures, and cubicles with an electrical installation. For instance, the actively driven pressure relief system may be used in power systems, power grids, in installation products, in semiconductor applications, with power converters, switchgears, circuit breakers, motors and generators, and in further industrial applications. Typically, the actively driven pressure relief system as described herein may be used for high power rectifiers and high current rectifiers.

Figure 1:
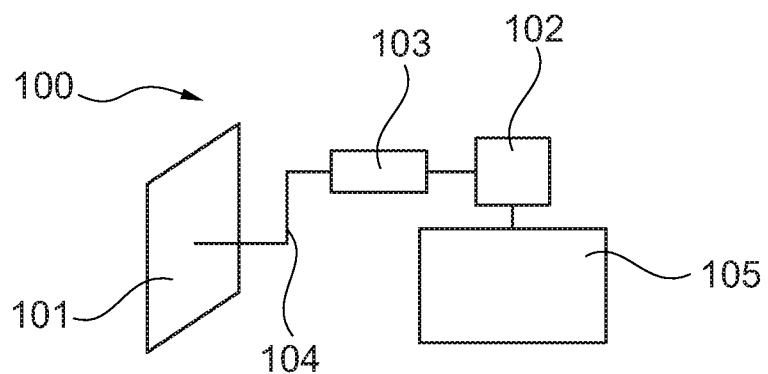
FIG. 1 is a schematic drawing of an actively driven pressure relief system and a panel according to embodiments described herein.

FIG. 1 shows a schematic drawing of an actively driven pressure relief system 100 and a panel 101 according to embodiments described herein. The actively driven pressure relief system 100 as shown in FIG. 1 has a fault detection device 102, which is in particular an arc fault detection device, and a triggering unit 103. The actively operated pressure relief system 100 includes in some embodiments an interface 104 for forwarding signals from the triggering unit to the panel of the container, the building, the enclosure, or the cubicle, or for forwarding a signal from the triggering unit to an opening mechanism of the actively operated pressure relief system. Further shown in FIG. 1 is an electrical installation 105, which is typically placed in a container, a building, an enclosure, or a cubicle (not shown in FIG. 1). The electrical installation may be the kind of electrical installation listed above, for which the actively driven pressure relief system according to embodiments described herein may be used. The actively operated pressure relief system may further include drive electronics. According to some embodiments, the panel 101 may include a section of metal sheet working as part of the wall of the building, container, or cubicle. In case of an arc fault, the arc detection device (or other adequate fault detection device) trigs the opening of the panel.

The fault detection device 102 is linked to the electrical installation 105 so as to be able to detect an arc fault in the electrical installation 105. For instance, the fault detection device 102 may be physically connected to a component of the electrical installation for detecting an arc fault. In one example, the fault detection device may measure one or more parameters of the electrical installation for controlling the electrical installation and checking whether an arc fault is appearing or not. According to some embodiments, which may be combined with other embodiments described herein, the detection device may include respective sensors for sensing and measuring useful parameters, such as an overcurrent, a reverse current, a pressure rise, a temperature rise, the transparency of the gas in the environment, and the like. According to some embodiments, the fault detection device may include a memory for storing threshold values for the parameter controlled by the fault detection device. For instance, the memory may include threshold values for the pressure, the temperature, an overcurrent, and the like. According to some embodiments, a threshold value for the pressure rise may typically be between about 0.5 kPa and about 15 kPa, more typically between about 1 kPa and about 15 kPa, and even more typically between about 1 kPa and about 10 kPa. In some embodiments, the electrical installation itself may have such a measurement unit for controlling the operation of the electrical installation. According to some embodiments, the electrical installation and the fault detection device may exchange information about the operation of the electrical installation and the appearance of an arc fault, in particular in a wireless manner.

According to some embodiments, the fault detection device 102 may include an arc detection device, an overcurrent detection device, a reverse current detection device, or a pressure rise detection device. Further parameters may be detected by the detection device 102, which indicate an upcoming pressure rise in the container, the building, the enclosure, or the cubicle.

The actively driven pressure relief system 100 as shown in FIG. 1 further includes a triggering unit 103. Typically, the triggering unit 103 stands in connection with the fault detection device 102, or is able to exchange information with the arc detection device 102, e.g. in a wireless manner. In embodiments described herein, the triggering unit 103 triggers an opening signal for opening the panel 101, when an arc fault is detected by the fault detection device 102. The opening signal generated and triggered by the triggering unit 103 may for instance be an electrical signal, a radio signal, a wireless signal, or the like.

In some embodiments the triggering unit 103 may be part of the fault detection device 102, e.g. the fault detection device and the triggering unit are one unit including both. In one example, a part of the detection device 102 may be able to generate a triggering signal and may, therefore, take the function of the triggering unit 103. According to some embodiments, the triggering unit can be part of the panel, e.g. by being located at, connected or mounted to the actively driven panel. In some embodiments, the detection device and the triggering unit may be included in the panel, e.g. by being located at the panel or by being mounted or connected to the panel.

As can be seen in FIG. 1, the actively driven pressure relief system 100 may include an interface 104 for forwarding signals from the triggering unit to the panel 101 of the container, the building, the enclosure, or the cubicle in some embodiments. The interface 104 may be a connection enabling that the signal from the triggering unit 103 reaches the panel 101. According to some embodiments, the interface may also be able to transfer and convert the signal. In some embodiments, the interface 104 may be able to ensure a proper transfer from the triggering unit 103 to the panel 101. According to some embodiments, the interface 104 may be connected to a mechanism for opening the panel (as described in detail below with respect to FIGS. 3a and 3b).

As explained above and according to embodiments described herein, the fault detection device 102, and the triggering unit 103 allow an opening of the panel 101 prior to a significant (and damaging) pressure rise within the container, building, enclosure, or cubicle 110.

Figure 2:
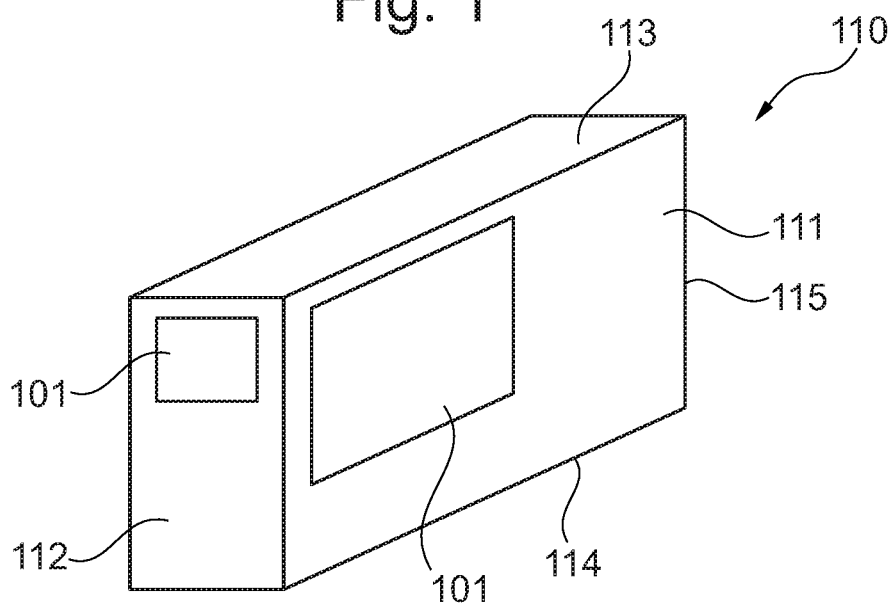
FIG. 2 is a schematic view of a container, a building, an enclosure, or a cubicle provided with a panel and an actively driven pressure relief system according to embodiments described herein.

A container 110 according to embodiments described herein can be seen in FIG. 2. The container 110 has several walls, of which walls 111, 112, 114, 115, and a ceiling 113 can be seen in FIG. 2. The container as shown in FIG. 2 includes two panels or flaps 101 in different walls of the container. According to some embodiments, the container, building, enclosure, or cubicle according to embodiments described herein may include more than two panels, or may only include one panel. In some embodiments, the one or more panels may be located in one wall or the ceiling of the container, building, enclosure, or cubicle. In other embodiments, the panels or flaps are distributed over different walls or the ceiling of the container, building, enclosure, or cubicle. The flap size or panel size can be adapted for the specific building, container, enclosure or cubicle. One as well as a number of flaps of different sizes can be installed. A combination of conventional passive flaps and active flaps or panels can also be considered in some embodiments. In some embodiments, the flaps are typically located close to the equipment with the highest risk for an arc fault. Moreover, the flaps may be distributed between the walls and possibly ceiling to efficiently vent the over pressure.

In FIG. 2, although not shown, the container, building, enclosure, or cubicle 110 includes an electrical installation and an actively driven pressure relief system, such as the actively driven pressure relief system 100 as shown and described with respect to FIG. 1. If a fault appears in the electrical installation, and especially an arc fault, the detection device and the triggering unit of the actively driven pressure relief system according to embodiments described herein initiate the opening of the panels. The signal generation and the signal transfer are faster than the pressure rise in the container, the building, the enclosure, or the cubicle. Thus, while in known system, the pressure in the container opens the panels (hereinafter called the passive panels) when the overpressure hits the container walls or ceiling, the panels as described in embodiments herein can be opened before the pressure reaches the walls or ceilings of the container.

The electrical installation includes one or more electrical devices. For instance, the electrical installation may be include a high power rectifier, a high current rectifier, a power converter, switchgears, circuit breakers, motors, generators, and the like. According to some embodiments, the power range for electrical installations as referred to herein may typically be between about 5 MVA to about 350 MVA, more typically between about 5 MVA and about 300 MVA, and even more typically between about 10 MVA and about 250 MVA. In some embodiments, the electrical installation may refer to a substation being in a range about 10 MVA. Typically, a rectifier may be in the range of about 250 MVA in some embodiments.

According to some embodiments, the panel, which can actively be opened, is located in the wall or ceiling of the container, building, enclosure, or cubicle being the nearest to the electrical device of the electrical installation with the highest risk of an arc fault. For instance, if the device of the electrical installation with the highest risk for an arc fault is nearest to the ceiling of the container, the actively operated pressure relief panel according to embodiments described herein may be placed in the ceiling. In some embodiment, if several devices of the electrical installation within the container, building, enclosure, or cubicle, have a similar risk of an arc fault, or if the risk of each of the devices exceeds a defined threshold, more than one actively driven panel may be provided in the walls and/or ceiling of the container, building enclosure, or cubicle.

In some embodiments, each of the electrical devices in the electrical installation with a defined risk for an arc fault is connected to an actively operated pressure release system according to embodiments described herein. The respective panel may be arranged in the wall nearest to the particular device. In that way, a very secure and quickly reacting way of operation of the electrical installation is possible. In other embodiments, and depending on the application and the kind of electrical installation, only one actively driven pressure release system may be provided for several electrical devices in an electrical installation.

According to some embodiments, after operation of the actively driven pressure relief system, the panel can be manually closed and the system is ready for operation again. This saves time and costs compared to the passive flap, which often has to be replaced or repaired after use.

In some embodiments, which may be combined with other embodiments described herein, the actively driven pressure relief system as described herein includes a panel opening mechanism or a flap opening mechanism. According to some embodiments, the triggering unit is adapted for generating a signal for the panel opening mechanism for opening the panel. Also, the interface 104 may be an interface between the triggering unit 103 and the panel opening mechanism. In particular, the interface 104 may be adapted for connecting the triggering unit with the panel opening mechanism.

In some examples useful for understanding the invention, the panel opening mechanism may be adapted for opening the panel without destructing the panel, i.e., opening the panel in a non-destructive manner. Examples of such a panel opening mechanism are given below. For instance, the flap or panel according to embodiments described herein can be fixed with hinges on one side while locked on the other side with a mechanical arrangement, as can be seen in FIGS. 3a and 3b described in the following.

Figures 3A, 3B:
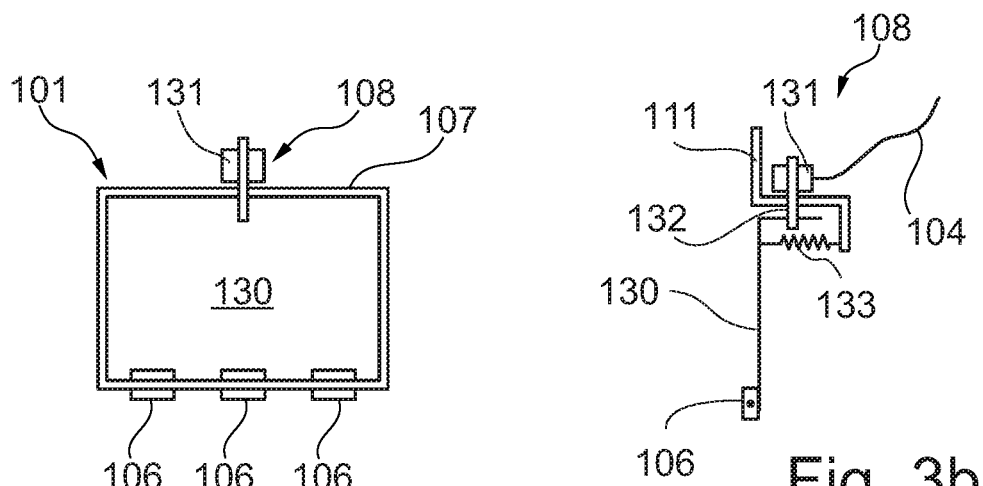
FIGS. 3a and 3b show a schematic drawing of an actively driven pressure relief system and a panel according to examples useful for understanding the invention, in a front view and in a side view.

FIG. 3a shows a schematic front view of an actively operated pressure relief panel 101 according to an example useful for understanding the invention. The panel 101 includes a flap 130, which may for instance be a sheet of metal or any other suitable material, e.g. suitable for being used as a part of a wall or ceiling of a container, building, enclosure, or cubicle with an electrical installation inside. The shape of the panel may vary depending on the respective application, the kind of container it is used in, the kind of wall or ceiling it is mounted to, the material, the surroundings, the electrical installation and the corresponding parameters of operation of the electrical installations, and the like. The panel 101 according to some embodiments described herein may include a frame 107, by which the panel may be mounted to the wall or ceiling of the container, building, enclosure, or cubicle. In some embodiments, e.g. in embodiments, where the triggering unit and/or the detection device are part of the panel, the triggering unit and/or the detection device may be mounted to the frame of the panel or may (directly) be connected to the panel, e.g. as part of the panel. The frame 107 may surround the panel completely and may, in some embodiments, be adapted for mounting components of the actively driven pressure relief panel 101 described above. In the example shown in FIG. 3a, the frame 107 is for instance used for mounting hinges 106 to the flap 130. In other embodiments, hinges 106 may be mounted to the flap without a frame.

The actively operated pressure relief system according to some embodiments described herein further includes a panel opening mechanism, such as a panel release mechanism 108 being mounted to the panel 101 as shown in FIG. 3a. In the example of an actively operated pressure relief panel shown in FIG. 3a, the panel opening mechanism includes a release solenoid 131. In FIG. 3b, the actively operated pressure relief panel 101 of FIG. 3a is shown in a side view. FIG. 3b shows the flap 130, the hinges 106, the panel opening mechanism 108 of the actively operated pressure relief system 100, and the interface 104, which electrically connects the panel opening mechanism 108 and the triggering unit 103 (not shown in FIGS. 3a and 3b). The panel opening mechanism 108 as shown in FIG. 3b includes the solenoid 131, a shaft 132 and a spring 133 to open the flap 130. Also, the wall 111 can be seen in FIG. 3b, to which the panel 101 is mounted.

Upon detection of an arc fault in the electrical installation in the container, building, enclosure, or cubicle, the detection device will detect the fault and inform the triggering unit so that the triggering unit generates a signal. The signal is transferred via the interface 104 (shown as a transfer line in FIG. 3b) to the panel opening mechanism 108, and especially to the solenoid 131. The solenoid 131 is adapted to open or move the shaft 132, which holds the panel to the wall 111 upon receipt of the signal from the triggering unit. When the shaft 132 is released, the pre-charged spring 133 forces the panel 130 to open in a wide manner and, therefore, release the pressure from the container, building, enclosure, or cubicle with the electric installation producing the arc fault. Due to the hinges 106, the panel 130 swings open and does not get lost or broken, when it is released from the wall. Therefore, the opening mechanism of the actively operated pressure relief system according to examples useful for understanding the invention described herein works in a non-destructive manner.

Apart from the example with the opening mechanism including a solenoid and a spring, other embodiments of the panel opening mechanism may be used, such as an electrical actuator, a solenoid, a pyrotechnical device, a compressed gas, or a pre-charged mechanical spring. Generally, two different solutions may be considered for the panel opening mechanism. The first solution is to release and open the panel from the container structure by means of a release mechanism operated by an electrical actuator, solenoid, pyrotechnical device or similar. The second solution is to prepare the panel with a pyrotechnical device that, at trig, ruptures the metal sheet. The second solution may therefore destroy the panel when opened. After an activation of the herein described actively operated pressure relief panel with the second solution, the panel has to be replaced. With the first solution (an example of which is shown in FIGS. 3a and 3b), the panel can be re-used after activation of the actively operated pressure relief system according to examples useful for understanding the invention described herein.

Figure 4:
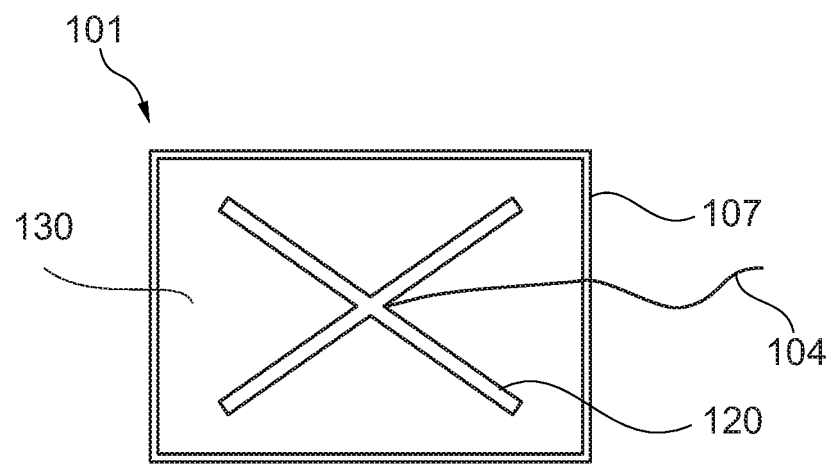
FIG. 4 shows a schematic drawing of a panel for an actively driven pressure relief system according to embodiments described herein.

FIG. 4 shows an example of a destructive opening of the panel. In FIG. 4, an actively operated pressure relief system 101 is shown. The panel is surrounded by a frame 107, as described above with respect to FIG. 3a. On the panel, a pyrotechnical charge 120 is placed. Typically, the pyrotechnical charge is chosen to be able to rupture the panel upon receipt of a triggering signal via the interface 104.

According to embodiments, which may be combined with other embodiments described herein, the housing (container, building, enclosure, or cubicle) is fluid-tight (in particular gas-tight). According to embodiments, which may be combined with other embodiments described herein, the panel in a closed state—before being opened in a destructive manner—provides a barrier between an inner volume of the housing and an environment outside of the housing. The barrier may in particular be fluid-tight, in particular gas-tight, and/or may prevent a pressure equilibration across the barrier. The barrier is removed, thereby allowing e.g. pressure equilibration, by opening the panel in a destructive manner.

According to embodiments, which may be combined with other embodiments described herein, a panel for opening a panel in a destructive manner may comprise a combination of at least two materials for facilitating a destruction of the panel at a contact point of the at least two materials. The at least two materials may form a predetermined break line or breaking point in the panel for, for example rupturing the panel with the panel opening mechanism. A predetermined breaking point or break line may have a regular shape or a random shape.

According to some embodiments, which may be combined with other embodiments described herein, the panel opening mechanism may be configured to destroy the panel by, for example, puncturing, tearing, or breaking the panel.

According to some embodiments, which can be combined with other embodiments described herein, the panel opening mechanism may blast away at least a part of the panel or the entire panel. The at least a part of the panel may be a replaceable insert into the panel or the entire panel may be a replaceable part.

The opening in a destructive manner includes any opening which affects the panel in an irreversible manner such that afterwards the panel is unable to fully close the housing.

The opening the panel in a destructive manner has the advantage of a particularly fast reaction time. Also, it provides an indication of an arc fault which typically requires maintenance. Since the arc fault requires maintenance anyway, the destructive opening does not significantly add to the maintenance requirements while increasing safety and reliability.

Figure 5:
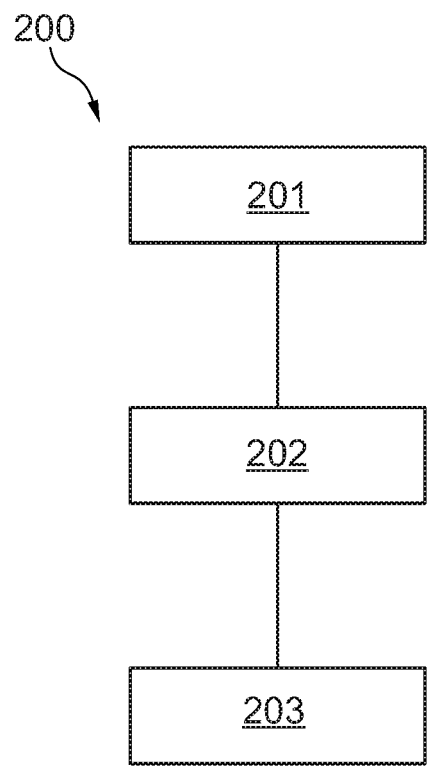
FIG. 5 shows a flow chart of a method method for relieving pressure from a container, building, enclosure, or cubicle according to embodiments described herein.

FIG. 5 shows a flow chart of a method for relieving pressure from a container, building, enclosure, or cubicle.

The container, building, enclosure, or cubicle has a panel, such as a metal sheet flap on at least one of the walls or the ceiling for releasing overpressure from the container, building enclosure, or cubicle. The container, building, enclosure, or cubicle further includes an electrical installation with one or more electrical devices being part of the electrical installation. The method 200 as shown in FIG. 5 includes in block 201 the detection of an arc fault in the electrical installation by a fault detection device. In particular, the fault detection device may be a fault detection device as described in embodiments above. In some examples, the fault detection device may be an arc detection device, an overcurrent detection device, a reverse current detection device, or a pressure rise detection device. The detection may take place via a physical connection of the fault detection device with an electrical device of the electrical installation, or may take place without such a connection, e.g. wirelessly, or by measuring parameter in the surroundings of the electrical device, such as the pressure, the temperature, the transparency and the like.

In block 202, the method 200 includes the triggering of an opening signal for the panel. For instance, if the detection device has detected an arc fault, the triggering unit may generate an opening signal for the panel. The opening signal may be an electrical signal, a radio signal, a wireless signal, or the like. The triggering unit may be a triggering unit as described with respect to FIG. 1. In particular, the triggering unit may be connected to the detection unit. In some embodiments, the triggering unit may be part of the detection unit.

In block 203, the opening signal for the panel is forwarded. According to some embodiments described herein, the signal may be forwarded by an interface between the triggering unit and an opening mechanism of the actively operated pressure relief panel. Further, block 203 includes initiating the opening of the panel of the container, building, enclosure, or cubicle. In some embodiments, and as described in detail with respect to FIGS. 3a and 3b, the opening may be initiated by the opening signal activating an panel opening mechanism, such as a solenoid, an electrical actuator, a compressed gas, a pre-charged mechanical spring, or a pyrotechnical device or material blowing the panel.

According to some embodiments, which may be combined with other embodiments described herein, detecting the arc fault in the electrical installation includes detecting an arc, an overcurrent, a reverse current, and a pressure rise. For example, detecting these parameters may include sensing and measuring these parameters in a regular interval or continuously.

In some embodiments, a second method is provided being a method for equipping a container, building, enclosure, or cubicle having an electrical installation inside with an actively driven pressure relief system. The second method includes providing one or more panels in one or more container, building, enclosure, or cubicle walls or ceiling. The one or more panels may be sized, shaped and located so as to prevent a high overpressure when an arc fault appears in an electrical device of the electrical installation. Further, the second method includes equipping the electrical installation with a fault detection device, e.g. a fault detection device as described in detail in embodiments above. The second method further includes connecting the fault detection device with a triggering unit for triggering a panel opening signal upon detection of an arc fault by the fault detection device. Typically, the triggering unit may be a triggering unit as described in embodiments above; and may—for instance—be part of the detection device. Additionally, the second method may include in some embodiments connecting the triggering unit with the panel via an interface. In particular, the signals triggered by the triggering unit may be forwarded to the panel via the interface. In some embodiments, the interface is connected to an opening mechanism of the panel, as exemplarily described with respect to FIGS. 3a, 3b, and 4. For details, reference is made to the embodiments described in detail above.

In some embodiments, equipping the electrical installation with a fault detection device may include equipping the electrical installation with an arc detection device, an overcurrent detection device, a reverse current detection device, and pressure rise detection.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. An actively driven pressure relief system for a container, a building, an enclosure, or a cubicle with an electrical installation, the actively driven pressure relief system including a panel and further comprising:
   a fault detection device for detecting an arc fault in the electrical installation of the container, the building, the enclosure or the cubicle;
   a triggering unit for triggering an opening signal for the panel upon detection of an arc fault by the fault detection device; and
   a panel opening mechanism, wherein the panel opening mechanism opens the panel in a destructive manner;
   wherein the fault detection device and the triggering unit allow an opening of the panel prior to a pressure rise exceeding a threshold within the container, building, enclosure, or cubicle.

2. The actively driven pressure relief system according to claim 1, the panel opening mechanism being at least one of: an electrical actuator, a solenoid, a pyrotechnical device, a compressed gas, or a pre-charged mechanical spring.

3. The actively driven pressure relief system according to claim 1, wherein the fault detection device includes at least one of: an arc detection device, an overcurrent detection device, a reverse current detection device, or a pressure rise detection device.

4. The actively driven pressure relief system according to claim 1, wherein the triggering unit is part of the fault detection device.

5. The actively driven pressure relief system according to claim 2, wherein the fault detection device includes at least one of: an arc detection device, an overcurrent detection device, a reverse current detection device, or a pressure rise detection device.

6. The actively driven pressure relief system according to claim 2, wherein the triggering unit is part of the fault detection device.

7. A container, building, enclosure, or cubicle with electrical installation including one or more electrical devices, the container comprising:
   a panel being part of at least one wall or ceiling of the container, the building, the enclosure, or the cubicle; and an active pressure relief system including the panel and further comprising:
- a fault detection device for detecting an arc fault in the electrical installation of the container, the building, the enclosure or the cubicle;
- a triggering unit for triggering an opening signal for the panel upon detection of an arc fault by the fault detection device; and
- a panel opening mechanism, wherein the panel opening mechanism opens the panel in a destructive manner;
- wherein the fault detection device and the triggering unit allow an opening of the panel prior to a pressure rise exceeding a threshold within the container, building, enclosure, or cubicle.

8. The container, building, enclosure, or cubicle of claim 7, wherein the panel is located in the wall or ceiling being the nearest to the electrical device of the electrical installation with the highest risk of an arc fault.

9. The container, building, enclosure, or cubicle according to claim 7, wherein the container is a container with a high power rectifier.

10. The container, building, enclosure, or cubicle according to claim 7, wherein the system includes more than one panel.

11. The container, building, enclosure, or cubicle according to claim 7, wherein the panel is a metal sheet panel.

12. The container, building, enclosure, or cubicle according to claim 8, wherein the container is a container with a high power rectifier.

13. A method for relieving pressure from a container, building, enclosure, or cubicle with a panel and an electrical installation inside the container, building, enclosure, or cubicle comprising:
- detecting an arc fault in the electrical installation by a fault detection device;
- triggering an opening signal for the panel of the container, building, enclosure, or cubicle upon detection of an arc fault by the fault detection device;
- forwarding the opening signal to the panel of the container, building, enclosure, or cubicle and initiating the opening of the panel of the container, building, enclosure, or cubicle by a panel opening mechanism, which opens the panel in a destructive manner; and
- opening of the panel prior to a pressure rise exceeding a threshold within the container, building, enclosure, or cubicle.

14. The method according to claim 13, wherein detecting an arc fault in the electrical installation including detecting an arc, an overcurrent, a reverse current, and a pressure rise.

* * * * *